(12) United States Patent
Menkovski et al.

(10) Patent No.: US 11,468,323 B2
(45) Date of Patent: Oct. 11, 2022

(54) USING A NEURAL NETWORK

(71) Applicant: KONINKLIJKE PHILIPS N.V., Eindhoven (NL)

(72) Inventors: Vlado Menkovski, Eindhoven (NL); Asif Rahman, Brookline, MA (US); Caroline Denise Francoise Raynaud, Paris (FR); Bryan Conroy, Garden City South (MA); Dimitrios Mavroeidis, Utrecht (NL); Erik Bresch, Eindhoven (NL); Teun van den Heuvel, Deventer (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 353 days.

(21) Appl. No.: 16/756,182

(22) PCT Filed: Oct. 16, 2018

(86) PCT No.: PCT/EP2018/078191
§ 371 (c)(1),
(2) Date: Apr. 15, 2020

(87) PCT Pub. No.: WO2019/076866
PCT Pub. Date: Apr. 25, 2019

(65) Prior Publication Data
US 2020/0242470 A1    Jul. 30, 2020

(30) Foreign Application Priority Data
Oct. 19, 2017    (EP) .................................... 17290131

(51) Int. Cl.
*G06K 9/62*    (2022.01)
*G06N 3/08*    (2006.01)
*G06N 20/00*    (2019.01)

(52) U.S. Cl.
CPC ............. *G06N 3/08* (2013.01); *G06K 9/6215* (2013.01); *G06K 9/6218* (2013.01); *G06K 9/6227* (2013.01); *G06N 20/00* (2019.01)

(58) Field of Classification Search
CPC ............ G06N 3/08; G06N 20/00; G06N 3/02; G06K 9/6215; G06K 9/6218; G06K 9/6227
(Continued)

(56) References Cited

U.S. PATENT DOCUMENTS 7,440,930 B1   10/2008   Brandt
8,352,395 B1    1/2013   Brandt
(Continued)

FOREIGN PATENT DOCUMENTS

JP    2000132554 A    5/2000
WO   2017151759 A1   9/2017

OTHER PUBLICATIONS

Sager, et al., "The Oryx/Pecos Operating System", AT&T Journal, vol. 64, No. 1, Jan. 1985, pp. 251-268.
(Continued)

*Primary Examiner* — Ali Bayat
(74) *Attorney, Agent, or Firm* — Micah-Shalom Kesselman

(57) ABSTRACT

A method, system and computer-program product for identifying neural network inputs for a neural network that may have been incorrectly processed by the neural network. A set of activation values (of a subset of neurons of a single layer) associated with a neural network input is obtained. A neural network output associated with the neural network input is also obtained. A determination is made as to whether a first and second neural network input share similar sets of activation values, but dissimilar neural network outputs or vice versa. In this way a prediction can be made as to
(Continued)

whether one of the first and second neural network inputs has been incorrectly processed by the neural network.

13 Claims, 4 Drawing Sheets

(58) Field of Classification Search
USPC .......................................................... 706/25
See application file for complete search history.

(56) References Cited

U.S. PATENT DOCUMENTS

| | | | |
|---|---|---|---|
| 2009/0204558 A1* | 8/2009 | Weston | G06N 3/08 706/20 |
| 2015/0294670 A1* | 10/2015 | Roblek | G10L 17/18 704/232 |
| 2018/0096245 A1* | 4/2018 | Toba | G06N 3/063 |
| 2018/0329886 A1* | 11/2018 | Li | G06F 40/30 |

OTHER PUBLICATIONS

Khosla, et al., "Building Image-Based Shoe Search Using Convolutional Neural Networks", Jan. 1, 2015, pp. 1-8. (Abstract).

Krause, et al., "Interacting with Predictions: Visual Inspection of Black-box Machine Learning Models", Human Factors in Computing Systems, ACM, May 7, 2016, pp. 5686-5697.

Paulo, et al., "Visualizing the Hidden Activity of Artificial Neural Networks", IEEE Transactions on Visualization and Computer Graphics, vol. 23, No. 1, Jan. 1, 2017, pp. 101-110.

International Search Report and Written Opinion for International Application No. PCT/EP2018/078191, filed Oct. 16, 2018, 18 pages.

* cited by examiner

USING A NEURAL NETWORK

RELATED APPLICATIONS

This application is the U.S. National Phase application under 35 U.S.C. § 371 of International Application No. PCT/EP2018/078191, filed on Oct. 16, 2018, which claims the benefit of and priority to European Application No. 17290131.6, filed Oct. 19, 2017. These applications are incorporated by reference herein.

TECHNICAL FIELD

Various embodiments described herein relate to the field of using a neural network. More particularly, but not exclusively, various embodiments relate to systems and methods of using a neural network formed of one or more layers.

BACKGROUND

It is important for users to have faith in new technologies if they are to be adopted, particularly in healthcare scenarios where, for example, the technology may be used to make healthcare decisions. Users tend to trust traditional systems because their operations are quite transparent and therefore their behavior is reasonably predictable.

In machine learning there is often a tradeoff between accuracy and intelligibility. Deep neural networks in particular have proven to be successful in learning useful semantic representation of data. However, deep neural networks have complex architectures and processes that make it hard for users to understand the decision-making processes performed in the neural network. Deep learning based systems therefore tend to lack transparency and predictability due to their complex structure and data-driven design process.

As a result of this lack of transparency in the processing of input data, users may come to distrust outputs of a neural network because they cannot easily verify the validity of the output or the methodology behind the process. Furthermore a user may disagree with an output and, without knowing how the neural network came to the decision that it did, this can breed distrust in the system. As a result, this can lead to discontinuation of use, or reduced adoption of what may actually be a very accurate, high performance technology.

There is therefore a need for methods and systems to improve the above-mentioned problems.

A neural network is formed of multiple units, referred to as artificial neurons, or simply "neurons", arranged in layers, which are configured to simulate the neurons of a brain. Each layer in a neural network model may perform a different transformation on its input. Neurons in a neural network are connected to one or more other neurons in the network by one or more connections, or edges. Each neuron or edge may have an associated weight (which may be referred to as a bias), which is applied to the output from the neuron, or to the connection from one neuron to a connected neuron. The weights can be updated with training of the neural network, for example using training data. A signal (e.g. data), travels from a first, input layer of a neural network to the last, output layer of the network, and may traverse one or more intermediate, "hidden" layers. With training, the weights are updated such that the output of the neural network becomes closer to the expected output.

SUMMARY

According to a first aspect, there is a computer implemented method a computer-implemented method for using a neural network formed of one or more layers of neurons, the method comprising using the neural network to process a first neural network input to produce a first neural network output; using the neural network to process a second neural network input to produce a second neural network output; determining a first similarity indicator, the first similarity indicator indicating a level of similarity between the first neural network output and the second neural network output. The method also comprises selecting a set of one or more neurons of the neural network, the set of neurons being a subset of the neurons of a single layer of the neural network; determining an activation value of each selected neuron when the neural network is used to process the first neural network input, to thereby produce a first set of activation values; determining an activation value of each selected neuron when the neural network is used to process the second neural network input, to thereby produce a second set of activation values; and determining a second similarity indicator indicating a level of similarity between the first set of activation values and a corresponding second set of activation values. The method also comprises determining whether either: the first similarity indicator indicates a level of similarity above a first predetermined threshold and the second similarity indicator indicates a level of similarity below a second predetermined threshold; or the first similarity indicator indicates a level of similarity below a third predetermined threshold and the second similarity indicator indicates a level of similarity above a fourth predetermined threshold, to thereby predict whether one of the first and second neural network inputs has been inaccurately processed by the neural network.

Thus, embodiments advantageously recognize or predict whether one of a first or second neural network input may have been inaccurately processed. In other words, a prediction can be made as to whether the neural network has generated an inaccurate neural network output. An inaccurate neural network output is one that does not reflect the intended or desired output of the neural network based on the neural network input (e.g. a misclassification of a neural network input or an insufficiently optimal solution to a problem).

Put yet another way, embodiments enable inconsistencies between the processing of two neural network inputs to be identified, thereby enabling an assessment as to the accuracy or error of the neural network to be performed. Thus, a prediction can be made as to whether the neural network is accurately performing a desired task on the neural network input(s), i.e. producing correct or accurate neural network outputs.

This can be advantageously used to prompt retraining of a neural network or to draw a user's attention to a possibility inaccurate neural network output (e.g. to avoid the user believing the neural network to be accurate).

A similarity indicator can be any (discrete, categorical or continuous) measure that indicates a level of similarity between two values or sets of values. By way of example, a binary indicator may indicate whether two (sets of) values are considered to be similar or dissimilar. In another example, a distance between two (sets of) values could form a similarity indicator, as (typically) a smaller a distance, a greater a similarity.

Embodiments rely on an understanding that using only a subset of neurons of a neural network to generate a set of activation values for comparison between two neural network inputs enables specific and particular information contained in a layer to be compared. For example, a first subset of neurons in a layer may be associated with a particular task of the neural network, whereas a second subset may be associated with a different task. Thus, an identification can be made as to whether a particular task is causing an inaccuracy in the processing of the neural network input, thereby enabling improved understanding of the neural network's limitations and/or underlying processes or enabling for directed retraining of the neural network. In particular, a more thorough understanding of a neural network's decision process may be provided to a user.

In embodiments, the step of using the neural network to process a first neural network input comprises classifying the first neural network input into a classification, the classification being the first neural network output; the step of using the neural network to process a second neural network input comprises classifying the second neural network input into a classification, the classification being the second neural network output; the step of determining a first similarity indicator comprises generating a first similarity indicator identifying whether the classifications of the first and second neural network inputs are the same; and the step of predicting whether one of the first and second neural network inputs has been inaccurately processed comprises determining whether either: the first similarity indicator indicates that the classifications of the first and second neural network inputs are the same and the second similarity indicator indicates a level of similarity below a second predetermined threshold; or the first similarity indicator indicates that the classifications of the first and second neural network inputs are different and the second similarity indicator indicates a level of similarity above a fourth predetermined threshold, to thereby predict whether one of the first and second neural network inputs has been inaccurately classified by the neural network.

In other words, the neural network may be adapted to perform classification of neural network inputs, and a determination of whether classifications are similar comprises determining whether they are identical. Thus, determination or prediction of whether a neural network has inaccurately processed one of the neural network inputs may comprise predicting whether the neural network has incorrectly classified one of the neural network inputs.

Preferably, the set of neurons comprises at least two neurons of the same layer.

The step of determining a second similarity indicator may comprises calculating a multidimensional distance between the first set of values and the second set of values. This provides a reliable method of determining a value representative of a similarity between two sets of values (as the size of the multidimensional distance represents a similarity). In such embodiments, the second and fourth predetermined thresholds can therefore be predetermined threshold distances.

The step of selecting a set of one or more neurons preferably comprises selecting one or more neurons in a same layer having activation values lying outside a predetermined range of activation values when the neural network is used to process the first neural network input. Alternatively, the step of selecting a set of one or more neurons may comprise selecting one or more neurons in a same layer having activation values lying outside a predetermined range of activation values when the neural network is used to process the second neural network input.

Thus, unusual activation values may define the set of neurons that are selected for the purposes of comparison. This increases a likelihood that potentially important neurons of a layer are identified.

Preferably, the step of using the neural network to process a second neural network input comprises using the neural network to process a plurality of second neural network inputs to thereby generate a plurality of second neural network outputs; the step of determining a first similarity indicator comprises determining, for each of the plurality of second neural network inputs, a first similarity indicator indicating a level of similarity between the first neural network output and the second neural network output to thereby produce a plurality of first similarity indicators; the step of producing a second set of activation values comprises determining, for each of the plurality of second neural network inputs, an activation value of each selected neuron when the neural network is used to process the second neural network input, to thereby produce a second set of activation values for each second neural network input and thereby a plurality of second sets of activation values; the step of determining a second similarity indicator comprises determining, for each of the plurality of second neural network inputs, a second similarity indicator indicating a level of similarity between the first set of activation values and a corresponding second set of activation values to thereby produce a plurality of second similarity indicators; and the step of predicting whether one of the first and second neural network inputs has been inaccurately processed by the neural network comprises: determining, for each second neural network input, whether either the first similarity indicator indicates a level of similarity above a first predetermined threshold and the second similarity indicator indicates a level of similarity below a second predetermined threshold; or the first similarity indicator indicates a level of similarity below a third predetermined threshold and the second similarity indicator indicates a level of similarity above a fourth predetermined threshold, to thereby predict, for each second neural network input, whether one of the first and second neural network inputs has been inaccurately processed by the neural network; and identifying all second neural network inputs for which it is predicted that one of the first and second neural network inputs has been inaccurately processed by the neural network.

In other words, more than one second neural network input may be assessed with respect to the first neural network input, so as to identify a collection or group of second neural network inputs that have at least one difference (e.g. either dissimilar neural network output or dissimilar set of activation values) with the first neural network. This enables a large set of potentially inaccurately processed neural network inputs to be identified.

Of course, it will be appreciated that it may be the first neural network input that has been inaccurately processed. Such a determination may be made if a large number or majority of the second neural network inputs (of the plurality of neural network inputs) are identified as being potentially inaccurately processed.

The step of determining a second similarity indicator for each second neural network input may comprise performing multidimensional clustering on the first set of activation values and each of the plurality of second set of activation values; and generating, for each second neural network input, a second similarity indicator indicating whether the first neural network input and the second neural network inputs are associated with sets of activation values in a same cluster.

Thus, a second similarity indicator may indicate whether the first set of activation values is in a same cluster as the second set of activation values. To perform the clustering, a large total number of second sets of activation values, and therefore second neural network inputs, (e.g. more than 50 or more than 100), may be required.

In some embodiments, the method further comprises, in response to predicting that one of the first and second neural network inputs has been inaccurately processed by the neural network, performing a training process on the neural network.

Thus, identifying that one of the first and second neural network inputs has been inaccurately processed may prompt a training processed to be performed. The training process may, for example, be based on a user input (e.g. indicating a correct neural network output for the first/second neural network input), or based on further training data for the neural network.

In other examples, the potentially inaccurately processed neural network input (and/or associated neural network output) is flagged for review by a user. This may comprise, for example, generating an alert.

According to a second aspect, there is a computer program product comprising a non-transitory computer readable medium, the computer readable medium having computer readable code embodied therein, the computer readable code being configured such that, on execution by a suitable computer or processor, the computer or processor is caused to perform the method of any of the embodiments described herein.

According to a third aspect, there is a system comprising a memory comprising instruction data representing a set of instructions and a processor configured to communicate with the memory and to execute the set of instructions. The set of instructions, when executed by the processor, cause the processor to use the neural network to process a first neural network input to produce a first neural network output; use the neural network to process a second neural network input to produce a second neural network output; determine a first similarity indicator, the first similarity indicator indicating a level of similarity between the first neural network output and the second neural network output; select a set of one or more neurons of the neural network, the set of neurons being a subset of the neurons of a single layer of the neural network; determine an activation value of each selected neuron when the neural network is used to process the first neural network input, to thereby produce a first set of activation values; determine an activation value of each selected neuron when the neural network is used to process the second neural network input, to thereby produce a second set of activation values; determine a second similarity indicator indicating a level of similarity between the first set of activation values and a corresponding second set of activation values; and determine whether either: the first similarity indicator indicates a level of similarity above a first predetermined threshold and the second similarity indicator indicates a level of similarity below a second predetermined threshold; or the first similarity indicator indicates a level of similarity below a third predetermined threshold and the second similarity indicator indicates a level of similarity above a fourth predetermined threshold, to thereby predict whether one of the first and second neural network inputs has been inaccurately processed by the neural network.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF THE EMBODIMENTS

Figure 1:
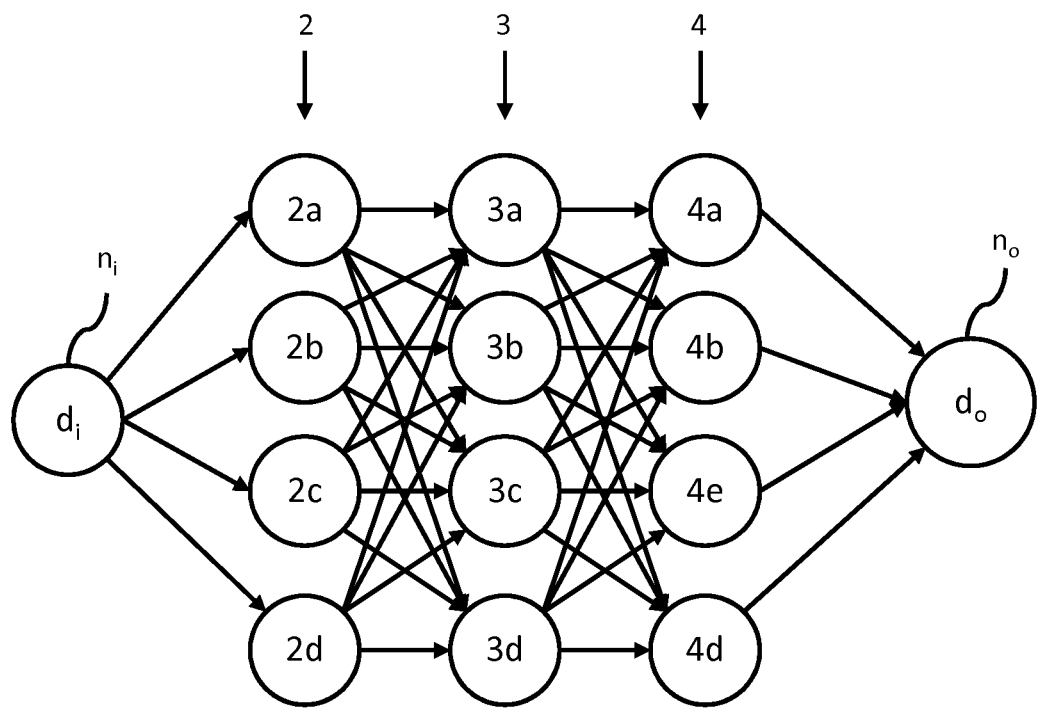
FIGS. 1 and 2 illustrate a neural network for contextual understanding of an embodiment.

There is provided an improved method and system for processing input data to a neural network, which overcomes some of the existing problems.

According to a concept of the invention, there is proposed a method, system and computer-program product for identifying neural network inputs for a neural network that may have been incorrectly processed by the neural network. A set of activation values (of a subset of neurons of a single layer) associated with a neural network input is obtained. A neural network output associated with the neural network input is also obtained. A determination is made as to whether a first and second neural network input share similar sets of activation values, but dissimilar neural network outputs or vice versa. In this way a prediction can be made as to whether one of the first and second neural network inputs has been incorrectly processed by the neural network.

Embodiments are at least partly based on the realization that neural network inputs associated with similar neural network outputs should be processed in a similar manner. In particular, by only using a subset of neurons of a single layer, a particular process stage of a process performed by the neural network can be assessed for accuracy.

Illustrative embodiments may, for example, be employed to identify neural networks that require additional training or to predict an accuracy of a neural network output. Such information is particularly important in the medical profession where output, such as classifications, by a neural network may be used to assist a clinician of physician in diagnosis or assessing the condition of a patient (e.g. by processing image data, such as a lung CT scan).

An envisaged neural network may be any type of neural network for processing a neural network input to provide an output, for example, a neural network that can be used for classifying a neural network input.

The neural network may be an artificial neural network, and in particular a deep neural network. Artificial neural networks or, simply, neural networks, will be familiar to those skilled in the art, but in brief, a neural network is a type of model that can be used to process input data to produce output data, for example, classifying input data such as a (medical) image.

In some embodiments, the neural network may be a neural network for use in classifying a neural network input as one or more types of data (e.g. classifying a neural network input as a particular type of medical data, such as a medical record). In some embodiments, the neural network may classify a neural network input according to content of the neural network input. For example, in embodiments where a neural network input is an image, the neural network may classify the image according to what is shown in the image (e.g. "heart" or "lung"). In some embodiments, the neural network may classify a neural network input according to an interpretation of the contents of the neural network input (for example, a structure in an image may be classified as "cancerous" or "non-cancerous").

FIG. 1 illustrates a representation of an example neural network 1, for the sake of clarity and context.

Generally speaking, the structure of a neural network is inspired by the human brain. A neural network 1 is comprised of layers 2, 3, 4, each layer 2 comprising a plurality of neurons 2a-2d, 3a-3d, 4a-4d. Each neuron comprises a mathematical operation. In the process of processing a neural network input d (e.g. received at an input node $n_i$) the mathematical operation of each neuron is performed on the neural network input to produce a numerical output, and the outputs of each layer in the neural network are fed into the next layer sequentially. A final layer 4 then provides a neural network output $d_o$ (e.g. in a pooling step), for example, at an output node $n_o$. The magnitude of the numerical output of a neuron (when classifying a neural network input) is often referred to as the "activation value" or "activation level" of that neuron. Thus, an activation value or activation level may be a numerical value representative of an amount of activation of a neuron during processing of neural network input.

Different layers of the neural network may perform different functions, as is well known in the art. For example, any given layer may be a convolution layer, a pooing layer, a rectified linear unit, a fully connected layer, a partially connected layer or a loss layer. Other possible functions for the different layers would be well known to the skilled person.

In some neural networks, such as convolutional neural networks, lower layers in the neural network (i.e. layers towards the beginning of the series of layers in the neural network) are activated by (i.e. their output depends on) small features or patterns in the neural network input being classified, while higher layers (i.e. layers towards the end of the series of layers in the neural network) are activated by increasingly larger features in the neural network input being processed.

As an example, where the neural network input $d_i$ comprises an image and the neural network is adapted to classify an image, lower layers in the neural network are activated by small features (e.g. such as edge patterns in the image), mid-level layers are activated by features in the image, such as, for example, larger shapes and forms, whilst the layers closest to the output (e.g. the upper layers) are activated by entire objects in the image. Different neural network inputs create different activation patterns (e.g. have different activation signatures in the network). For example, if a neural network is adapted to perform a classification of images, images of hearts produce different activation patterns to images of lungs. A neural network thus processes neural network inputs according to the activation patterns they produce in the neural network.

In general, a neuron may be considered to have a "high" or "strong" activation if the mathematical operation produces an output outside of a range that is normal (e.g. statistically average, or approximately average) for that neuron. Conversely, a neuron may be considered to have a "low" or "weak" activation if the mathematical operation produces an output that falls within a range that is normal (e.g. statistically average, or approximately average) for that neuron. A normal range may be defined statistically (for example, a certain number of standard deviations from an average activation value for the neuron when the neuron classifies neural network inputs). Another way of comparing activation values of neurons is to compare the activation value of a neuron to other neurons on the neural network. For example, an activation of a neuron may be considered high or low when compared to the magnitudes of activations of other neurons in the same layer. In some embodiments, a neuron may be considered to be highly activated if the activation value of the neuron (e.g. the numerical output) is statistically outlying compared to the activation values of other neurons in the same layer. A statistical outlier may be defined in many different ways, as will be appreciated by the person skilled in the art. As an example, a neuron may have an activation value that is statistically outlying if its value is more than a number, x, standard deviations from the average activation value of neurons in the same layer. The person skilled in the art will be familiar with other ways of determining a statistical outlier.

In some examples, a range of activation of a neuron (e.g. a numerical range output by the neuron) may depend on the type of mathematical operation performed by that neuron. Some neurons are activated (e.g. produce outputs) between 0 and 1 (for example neurons employing sigmoid functions), while others may have unbounded activation values (e.g. they may produce outputs anywhere between $-\infty$ and $+\infty$).

In some examples herein, where a neural network input $d_i$ comprises an image and the neural network is for classifying the contents of the image, each neuron in the neural network may comprise a mathematical operation comprising a weighted linear sum of the pixel (or in three dimensions, voxel) values in the image followed by a non-linear transformation. Examples of non-linear transformations used in neural networks include sigmoid functions, the hyperbolic tangent function and the rectified linear function. The neurons in each layer of the neural network generally comprise a different weighted combination of a single type of transformation (e.g. the same type of transformation, sigmoid etc. but with different weightings). As will be familiar to the skilled person, in some layers, the same weights may be applied by each neuron in the linear sum; this applies, for example, in the case of a convolution layer. The output of each neuron may be a number and the magnitudes of the numerical outputs of the neurons may form a neuron activation pattern that can be used to classify the image.

The present invention proposes a concept for assisting in the identification of whether a processing of a neural network input $d_i$ to produce a neural network output $d_o$ has been inaccurately performed. In other words, the concept proposes to predict whether a neural network output is incorrect. The concept may be realized by a computer-implemented method, system or computer program product, as set out below.

The inventors have recognized that neural network inputs $d_i$ associated with similar neural network outputs $d_o$ should be processed in a similar way by the neural network. Thus, it has been recognized that there should also be a similarity between activation values or activation values of neurons, during processing of different neural network inputs, if there is sufficient similarity between the neural network outputs associated with the different neural network inputs. A dissimilarity may indicate an inaccurate processing of one of the neural network inputs.

The inventors have also recognized that selection of only a subset of neurons of a single layer (for comparison activation values thereof between different neural network inputs) reveals additional information about where a possible inaccuracy has occurred and thereby the possible limitations of the neural network. For example, certain neurons of a particular layer may be more representative of a certain identification process so that it can be more accurately identified as to which part of the neural network process is inaccurate. For example, if a neural network is adapted to perform identification of potential malignant nodules in an lung CT image, a first subset of neurons in a layer may be associated with identifying a location of the nodules (which could contribute to its malignancy) whereas a second, different subset of neurons may be associated with identifying a shape of the nodules (which could also contribute to its malignancy). Thus, by using only a subset of neurons (e.g. only those associated with location of potential nodules), more appropriate and useful information can be obtained.

In particular, the inventors have recognized that a significant amount of information is lost if all neurons in a layer are used, rather than only a subset of that layer. Thus, collapsing activation values of all neurons in a layer (e.g. into a single value for comparison purposes) leads to loss of information.

Selection of only a subset of neurons may also enable only the most important neurons (e.g. those that contribute the most to processing of a neural network input) to be identified. This can avoid unimportant neurons disproportionately affecting the determination of whether sets of activation values for two neural network inputs are similar or dissimilar.

Embodiments may also be used to provide information to a user to help the user understand why the first and/or second neural network input was processed in the way that it was. The user may be able to look for differences between the first neural network input and the second neural network input to see how the model distinguished between them. This helps to provide more clarity to the user as to the classification methodology of the model, thus improving user confidence in the model's accuracy and reliability.

Figure 2:
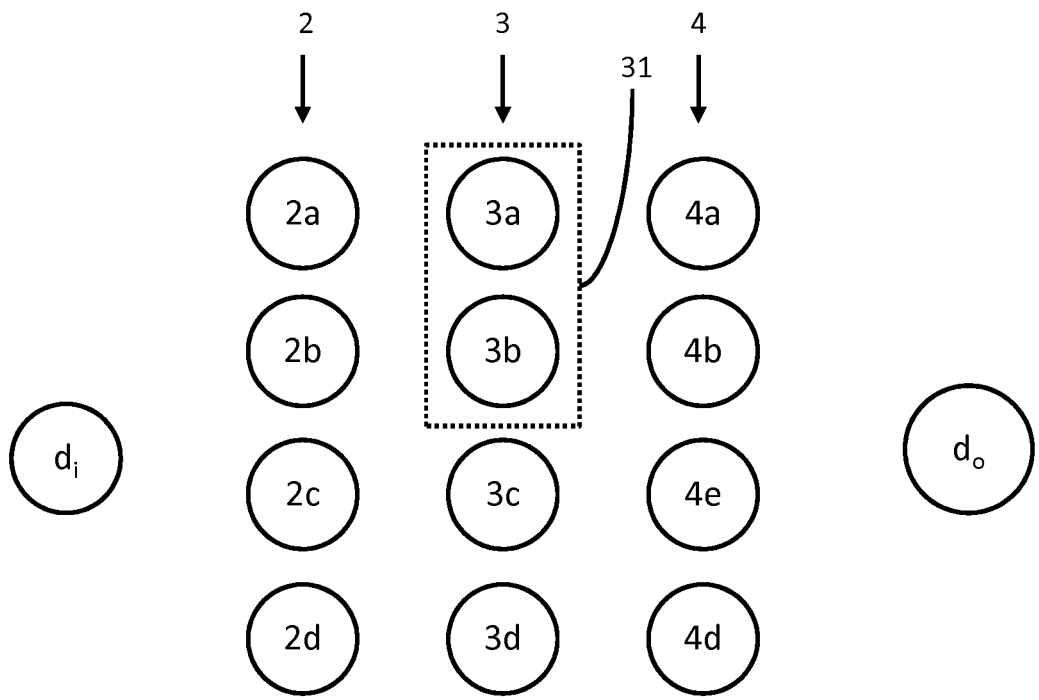

FIG. 2 illustrates a neural network 1 in which the proposed concept is employed. For the sake of clarity, connections between neurons of different layers have been omitted.

A subset 31 of one or more neurons in a single layer 3 is selected. The subset 31 consists of only a fraction of the neurons 3a, 3b lying in a single layer (i.e. and does not comprise an entire layer of neurons). A set of activation values is formed by determining the activation values of the subset of neurons when those neurons are processing a neural network input. Thus, a neural network input $d_i$ can be associated with a set of activation values (not shown) of a subset 31 of neurons 3a, 3b, whilst those neurons 3a, 3b are processing the neural network input $d_i$ during processing of the neural network input.

There is proposed an aim of identifying two neural network inputs that are associated with similar neural network outputs, but which have sets of activation values that are dissimilar to one another (or vice versa). Such an identification enables identification of potentially incorrect processing of a neural network input, which could indicate that a neural network output is inaccurate and/or that the processing performed neural network is inaccurate (e.g. is under-fitting or overfitting).

Embodiments for selecting the subset 31 of neurons will be later described. However, some embodiments may include receiving a user input indicating which subset of neurons are to be investigated. Thus, there may be a user-led investigation into the accuracy of the neural network. Other embodiments may automatically select an appropriate subset 31 of neurons.

Figure 3:
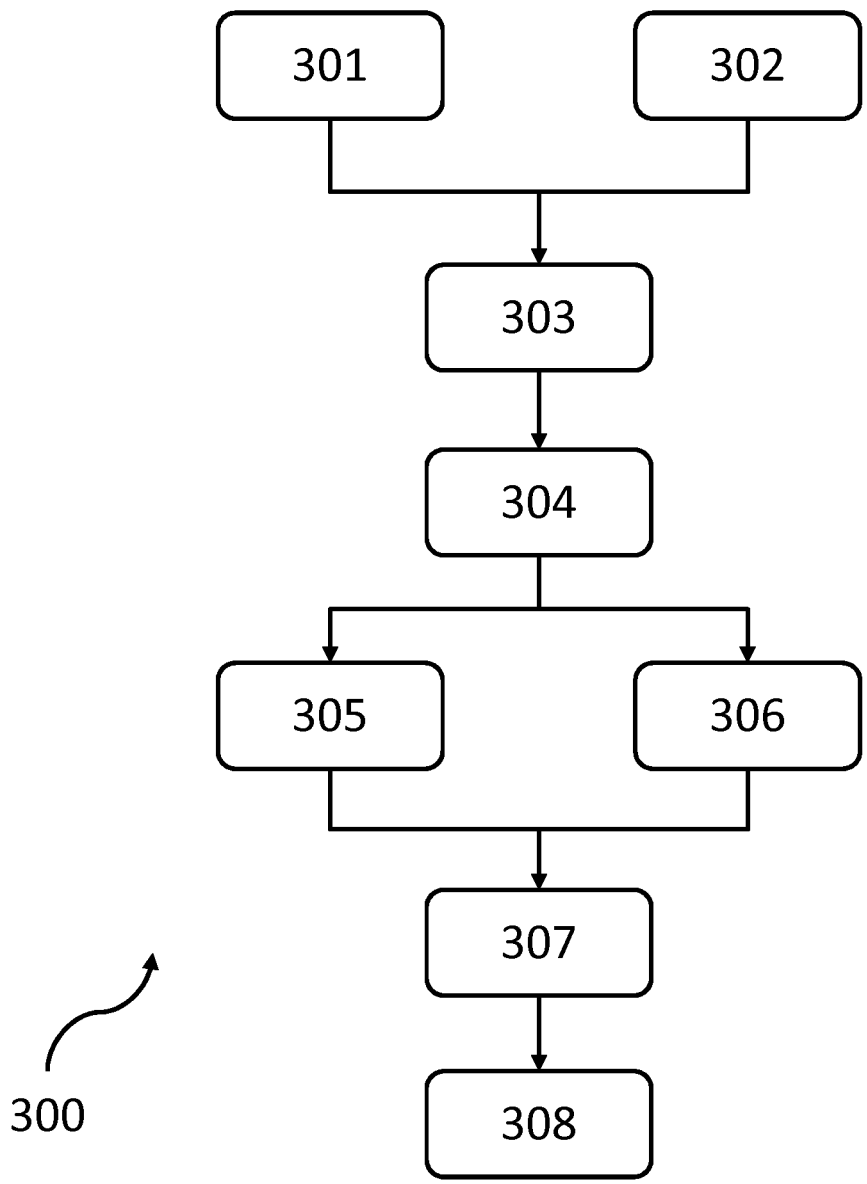
FIG. 3 illustrates a computer-implemented method according to an embodiment.

FIG. 3 illustrates a computer-implemented method 300 for processing data according to an embodiment. The illustrated method 300 can generally be performed by or under the control of a processor of a system (such as those later described). The method may be partially or fully automated according to some embodiments.

The method 300 comprises a step 301 of using the neural network to process a first neural network input to produce a first neural network output. The method 300 also comprises a step 302 using the neural network to process a second neural network input to produce a second neural network output.

Thus, two neural network inputs for a neural network are processed by the neural network to provide respective neural network outputs. Steps 301 and 302 may be performed in parallel or in series. It will be appreciated that steps 301 and 302 may be performed at an earlier point in time, with the neural network outputs being stored (e.g. in a database) for later processing.

The method 300 also comprises determining a first similarity indicator, the first similarity indicator indicating a level of similarity between the first neural network output and the second neural network output.

The first similarity indicator may, for example, indicate a (multi-dimensional) distance between the first neural network output and the second neural network output. Other methods of determining a similarity between two neural network outputs will be apparent to the skilled person. For example, where the neural network performs a classification operation, a first similarity indicator may indicate whether the first and second neural network outputs indicate whether the first and second neural network inputs belong in the same classification or not.

The method 300 also comprises a step 304 of selecting a set of one or more neurons of the neural network, the set of neurons being a subset of the neurons of a single layer of the neural network. Thus, a subset 31 of neurons in a same layer 3 are selected. The selection of the subset may, for example, be based on a user input or based on activation values of the neurons in that layer during processing of the first/second input neural network input. The selection of the layer 3 may be based on a user input, or may be a predetermined layer (e.g. the outermost layer of the neural network).

In particular embodiments, step 304 comprises selecting only a single neuron of the neural network. However, in preferable embodiments, step 304 comprises selecting at least two neurons of the same layer. It should be clear that the subset 31 of selected neurons does not comprise all neurons of a single layer.

The method 300 also comprises a step 305 of determining an activation value of each selected neuron when the neural network is used to process the first neural network input, to thereby produce a first set of activation values. The method 300 also comprises a step 306 of determining an activation value of each selected neuron when the neural network is used to process the second neural network input, to thereby produce a second set of activation values.

Thus, the steps 305, 306 determine (for each neural network input) activation values of the selected set 31 of neurons whilst the neural network processes that neural network input. In this way, two sets of activation values are generated.

The method comprises a step 307 of determining a second similarity indicator indicating a level of similarity between the first set of activation values and a corresponding second set of activation values. Thus, the two set of activation values are compared to generate a second similarity indicator, indicating a level of similarity between the two.

Step 307 may, for example, comprise determining a multi-dimensional distance between the two sets of activation values. In another example, step 307 may comprise determining if the two sets of activation values share a same number of activation values above a predetermined threshold value (e.g. 0.5 if the activation values have a maximum range of 0 to 1 or 50%). Step 307 may comprise determining how many corresponding activation values between the sets (e.g. compare a first activation value of the first set to a first activation value of a second set, a second activation value of the first set to a second activation value of the second set and so on) are within a predetermined error margin of one another (e.g. ±1% or ±10%). Various other methods of determining a similarity between two sets of activation values will be readily apparent to the skilled person.

It will be understood by the person skilled in the art that no two sets of activation values will be strictly identical (because the numerical outputs are produced on a continuous scale). Therefore, in some embodiments, a second similarity indicator may indicate whether the sets of activation values are within a tolerance (or threshold similarity) of one another.

As previously mentioned, in some embodiments, step 307 comprises calculating a multidimensional distance between the first set of activation values and the second set of activation values. For example, considering each neuron as a dimension in a multi-dimensional space, a Euclidian distance can be calculated (e.g. according to a squared sum of the difference between the first set of activation values and the second set of activation values). Thus, a multidimensional distance can be calculated, which distances indicates a similarity between the two sets of activation values.

Of course, where the subset 31 of neurons comprises only a single neuron, step 307 may comprise determining a numerical difference between the single activation value in the first set of activation values and the single activation value in the second set of activation values.

In some embodiments, step 307 may comprise identifying a difference between the number of statistically significant activation values in the first set of activation values and the number of statistically significant activation values in the second set of activation values. Here a statistically significant activation value may be one which is more than a certain number (e.g. 2, 3 or 4) of standard deviations from an average activation value of that neuron. In order embodiments, a statistically significant activation value may be one which is outside a predetermined range of activation values.

The method 300 then comprises a step 308 of determining whether the first similarity indicator indicates a level of similarity above a first predetermined threshold and the second similarity indicator indicates a level of similarity below a second predetermined threshold (or vice versa).

Thus, step 308 may alternatively or also comprise determining whether the first similarity indicator indicates a level of similarity below a third predetermined threshold and the second similarity indicator indicates a level of similarity above a fourth predetermined threshold.

The value and unit of the predetermined thresholds will, of course, depend upon the nature of the similarity indicators. For example, where a similarity indicator is represented by a multidimensional distance, a predetermined threshold will be a predetermined distance.

In this way, step 308 effectively performs an exclusive OR function (XOR), to determine whether the first and second neural network outputs are similar, but the two corresponding sets of activation values are dissimilar (or vice versa).

In this way, a prediction can be made as to whether one of the first and second neural network inputs has been inaccurately processed by the neural network. This prediction can be made because it has been recognized that that a neural network should process neural network inputs associated with similar neural network outputs in a similar way, such that a deviance from this assumption may indicate a potential inaccurate processing by the neural network.

Such a recognition can enable potential inaccurate processing of a neural network input to assessed and taken into account. For example, potential inaccuracies can be flagged to a user (e.g. for manual assessment), with the result of the manual assessment being used to retrain the neural network (i.e. as a feedback system). Potential inaccuracies may also be flagged to a user to help them understand the underlying process of the neural network. In some examples, identification of a potential inaccuracy prompt retraining of the neural network, e.g. based on user feedback or by acquiring new training data).

Embodiments are particularly advantageous when employed with a neural network adapted to perform a classification process (i.e. where a neural network output is a classification of the neural network input). This is because inaccurate classification (e.g. of medical images) can lead to misdiagnosis or misunderstandings of neural network inputs. Thus, there is a particular incentive to identify potential misclassifications.

Thus, in some embodiments, steps 301 and 302 comprise using the neural network to determine a classification of the first and second neural network inputs respectively. Corresponding step 303 may comprise generating a first similarity indicator indicating whether the first and second neural network inputs are classified into a same classification (i.e. if the corresponding first and second output neural network outputs indicate a same classification). In step 308, it can be assumed that the first similarity indicator indicates a level of similarity above a first predetermined threshold if the first similarity indicator indicates that the first and second neural network output (and thereby neural network inputs) are in a same classification. Similarly, it can be assumed that the first similarity indicator indicates a level of similarity below a third predetermined threshold if the first similarity indicator indicates that the first and second neural network output (and thereby neural network inputs) are in different classifications.

In some embodiments, step 304 of FIG. 3 may comprise identifying a subset of neurons in a single layer of the neural network that are activated by the first neural network input (during block 301 of using the neural network to process the first neural network input) outside of a predetermined activation range associated with said first set of neurons. Thus, selection of the subset of neurons may comprise identifying neurons (of a same layer), for which the activation values of said neurons during processing of the first neural network input lie outside of a predetermined activation range.

In more detail, as described above, each neuron in a layer is activated (e.g. produces a numerical output) within upper and lower limits. The upper and lower limits of the activation values depend on the mathematical operations performed by the neuron. Within these upper and lower limits, a neuron may have a typical range (e.g. statistically normal range) within the upper and lower limit. For example, although a neuron may be activated between upper and lower limits, for most neural network inputs, the neuron may only be activated within an activation range associated with the neuron. When classifying a neural network input, the classification may be determined based on certain strong characteristics or features of the neural network input which may produce strong (e.g. statistically unusual) activations in certain neurons in the network whereby the activation lies outside (above/below) the activation range associated with the neuron, i.e. identifying statistically outlying activation values.

As such, in embodiments, identifying a set of neurons in the neural network that are activated outside of activation ranges associated with said first set of neurons may comprise comparing the activation value of a neuron (i.e. an activation value used in classifying the first neural network input) to the activation values of the same neuron used in classifying the second neural network inputs. For example, an average activation value and associated standard deviation of the distribution of activation values may be calculated. Identifying a set of neurons in the neural network that are activated outside of activation ranges associated with said set of neurons may thus comprise identifying neurons in a single layer that are activated (by the first neural network input) by more than a certain number of standard deviations from (e.g. above or below) the average activation of the neuron.

In some embodiments, identifying a first set of neurons in the neural network that are activated outside of activation ranges associated with said first set of neurons may comprise comparing the activation value of a neuron (when classifying the first neural network input) to the activation values of other neurons in the same layer when classifying the first neural network input. Generally, neurons in the same layer comprise the same mathematical operations (with different weightings), and thus the activations of the neurons in a layer are directly comparable (e.g. a sigmoid layer always produces an output between 0 and 1). Thus, activation values of neurons within a layer can be compared to find the most strongly (e.g. statistically unusually) activated neurons in a layer.

The proposed step 304 may be modified to instead identify a subset 31 of neurons in a single layer based the second neural network input (e.g. identifying neurons having activation values outside of a predetermined range when processing the second neural network input), mutatis mutandis.

In some embodiments, step 304 comprises selecting a set of neurons in an outer layer of the neural network. Here, an outer layer refers to any one of the layers closest to an output (e.g. output node $n_o$) of the neural layer. An outer layer may, for example, be one of the layers in a final third of the neural network. Preferably, the outer layer is the outermost layer 4 (e.g. the final layer 4 in the neural network before the output $n_o$). Outer layers are activated by the largest features of a neural network input (such as entire objects in an image) and as such, subsets of neurons of neural network inputs that have common activation values in an outer layer of the neural network, correspond to the neural network inputs having the most similar global features. As such, identifying neural network inputs having similar activation values in subsets of neurons in an outer layer of the neural network, yet dissimilar neural network outputs, (or vice versa) has the advantage of identifying neural network inputs with similar large scale features that nonetheless were processed differently (or vice versa). This improves an accuracy in identifying potentially incorrectly processed neural network inputs.

Although there may be advantages associated with using subsets of neurons in higher layers, it will be appreciated by the skilled person that subsets of neurons in any layer can be used.

In some embodiments, where step 307 comprises determining a multidimensional distance between the first set of activation values and the second set of activation values, the second and/or fourth predetermined thresholds of step 308 may comprise a predetermined threshold distance. As will be appreciated by a person skilled in the art, an appropriate threshold value for use in step 308 will depend on the neurons of the neural network and the neural network inputs being processed.

The method 300 may be performed for a plurality of different second neural network inputs. That is, the steps of the method may be modified so that the first neural network input is compared to more than one second neural network input. However, in preferred embodiments, the selected set of neurons is the same for the first neural network inputs and each second neural network input. In other words, the method 300 may be adapted to compare a first neural network input to more than one second neural network input. This enables second neural network inputs meeting the requirements of step 308 to be identified, thereby enabling identification of further neural network inputs which may have been processed incorrectly.

In other words, step 302 may be adapted to comprise using the neural network to process a plurality of second neural network inputs to thereby generate a plurality of second neural network outputs. Step 303 may be adapted to comprise determining, for each of the plurality of second neural network inputs, a first similarity indicator indicating a level of similarity between the first neural network output and the second neural network output to thereby produce a plurality of first similarity indicators. Step 306 nay be adapted to comprise determining, for each of the plurality of second neural network inputs, an activation value of each selected neuron when the neural network is used to process the second neural network input, to thereby produce a second set of activation values for each second neural network input and thereby a plurality of second sets of activation values. Step 307 may be adapted to comprise determining, for each of the plurality of second neural network inputs, a second similarity indicator indicating a level of similarity between the first set of activation values and a corresponding second set of activation values to thereby produce a plurality of second similarity indicators. Step 308 may be adapted to comprise determining, for each second neural network input, whether either the first similarity indicator indicates a level of similarity above a first predetermined threshold and the second similarity indicator indicates a level of similarity below a second predetermined threshold; or the first similarity indicator indicates a level of similarity below a third predetermined threshold and the second similarity indicator indicates a level of similarity above a fourth predetermined threshold, to thereby predict, for each second neural network input, whether one of the first and second neural network inputs has been inaccurately processed by the neural network. Step 308 may further comprise identifying all second neural network inputs for which it is predicted that one of the first and second neural network inputs has been inaccurately processed by the neural network.

In this way, envisaged methods can identify one or more second neural network inputs associated with similar neural network outputs but dissimilar sets of activation values or vice versa. This enables a dataset of potentially incorrectly processed neural network inputs to be identified, which can be provided to a user to help them understand an underlying process of the neural network or to guide retraining of the neural network.

In some embodiments, step 307 may comprise performing multidimensional clustering on the first set of activation values and each second set of activation values, so that the second similarity indicator indicates whether the first set of activation values is in a same cluster as a corresponding second set of activation values. For example, the first set of activation values associated with the first neural network input and the second set of active activation values associated with each of the plurality of second neural network input may be plotted in a multi-dimensional parameter space. In such embodiments, a similarity indicator may indicate whether a first and second set of activation values are located in a same cluster in the multi-dimensional parameter space.

Corresponding step 308 may comprise identifying the second neural network inputs associated with a second set of activation values that lies within at least one cluster associated with the first set of activation values of the first neural network input, and for which a first similarity indicate indicates a level of similarity below a third predetermined threshold. Alternatively and/or additionally, step 308 may comprise identifying the second neural network inputs associated with a second set of activation values that lies within at least one cluster associated with the first set of activation values of the first neural network input, and for which a first similarity indicate indicates a level of similarity below a third predetermined threshold.

The skilled person will appreciate that the method 300 may be iteratively repeated for different instances of a first neural network input. For example, there may be a database of neural network inputs, each of which is processed according to a method 300 (e.g. and each of which may be compared to each other neural network input of the database). This increases a likelihood that potentially incorrectly processed neural network inputs will be identified.

The skilled person will also appreciate that the method 300 may be repeated for different subsets of neurons. In such instances, there is no need to repeat steps 301-303 (as a similarity between neural network outputs will already have been identified). Thus, steps 304-308 may be repeated for different subsets of neurons. This provides yet more additional information to be identified.

According to some embodiments described above, there is a method and system for identifying at least one second neural network input sharing some similarity (between either sets of activation values or neural network outputs) with a first neural network but also some dissimilarity (the other of the sets of activation values and neural network outputs). For example, because the identified second neural network input may represent a neural network input that has a set of activation values in common with the first neural network input, it may be considered to be similar to the first neural network input in some way, but nonetheless, the neural network provides a dissimilar neural network output to that associated with neural network input. The method 300 may therefore be used to identify a particular neural network input that may be used to help elucidate the underlying process of the neural network.

In some embodiments, the identified second neural network input may be considered to be a counter-example, because it may serve to illustrate a counter-example made by a similar neural network input to the first neural network input. This particular second neural network input may thus be used to highlight to a user the manner in which the model processed the first neural network input and/or discriminates between neural network outputs (e.g. classifications) similar to the neural network output (e.g. classification) given to the first neural network input. Thus, rather than recognizing an inaccurately processed neural network input, the methods may be used to elucidate a processing of the neural network system.

Although not illustrated in FIG. 3, any of the embodiments described herein may further comprise using the identified second neural network input(s) in a training process to improve the neural network.

For example, in embodiments comprising displaying identified second neural network inputs to a user, the user may provide feedback on each second neural network input and/or the first neural network input. For example, the user may provide feedback on a correct neural network output for a particular neural network input and/or the first neural network input. Such feedback may be used to re-train the model. For example, the feedback may be used to select neural network inputs (e.g. similar or dissimilar to the identified second neural network input) with which to further train the model.

Alternatively or additionally, a user may provide feedback as to whether the second neural network input helped the user to better understand the underlying process of the model. Such feedback may be used to improve the selection of the second neural network input so as to improve the information provided to the user to further improve their confidence in the underlying process of the neural network.

Although not illustrated in FIG. 3 any of the embodiments described herein may further comprise using the neural network to identify (e.g. from a plurality of second neural network inputs) a second neural network input that is similar to the first neural network input, i.e. where both the first similarity indicator (indicating a similarity between first and second neural network outputs) indicates a similarity above a first predetermined threshold and a second similarity indicator (indicating a similarity between two sets of activation values of a same subset of neurons in a same layer) indicates a similarity above a third predetermined threshold (i.e. are similar). In some embodiments, the method may further comprise displaying the similar second neural network input to a user. In this way, the user may be provided with an example or examples of second neural network inputs that are processed in a similar manner to (e.g. have a similar set of activation values) and have similar outputs (e.g. identical classifications) to the first neural network input, e.g. in addition to a second neural network input that is processed in a different manner to (e.g. have a similar set of activation values) and has a similar output (or vice versa). This may provide further insights into the types of second neural network inputs that are processed in the same way as the first neural network input as well as differently to the first neural network input.

Thus, proposed embodiments may also identify if a second neural network input is associated with a set of activation values and a neural network output which are both similar to those associated with a first neural network input. In this way, a prediction may be made as to whether a first/second neural network input have been accurately processed.

Although not illustrated in FIG. 3, any of the embodiments described herein may further comprise displaying the second neural network input(s) to a user, for example using user interface 504 of system 500 described below. In some embodiments, the first neural network input may be displayed to the user alongside the second neural network input.

In some embodiments, and when the neural network performs a classification operation, the classification of the first neural network input and/or the classification of the second neural network input may further be displayed to the user. In this way, the user is able to compare the first neural network input to the second neural network input and gain deeper insight into the classification process of the neural network. For example, the user may be able to observe similarities and/or differences between the first neural network input and the second neural network input that led the model to classify the first/second neural network input in the way that it did.

In embodiments, other information about the second neural network input(s) may be provided to the user, such as, for example, one or more annotations of the second neural network input(s). An annotation may be information about the neural network input that has been added by a user (e.g. such as a medical professional). If the displayed annotations were used to train the neural network, then such annotations may provide further insight into the underlying process of the neural network and may be used to improve the neural network (for example, by improving the quality of the annotations provided to the neural network in the training process).

Examples of annotations include, but are not limited to, user classifications or labels of features in a neural network input (for example, a user may highlight a feature in the neural network input, such as the location of an anatomical structure, or the location of an abnormality) and user interpretation of the content of a neural network input, such as, for example, the user's diagnosis of a condition or disease, as derived from the contents of the neural network input.

Figure 4:
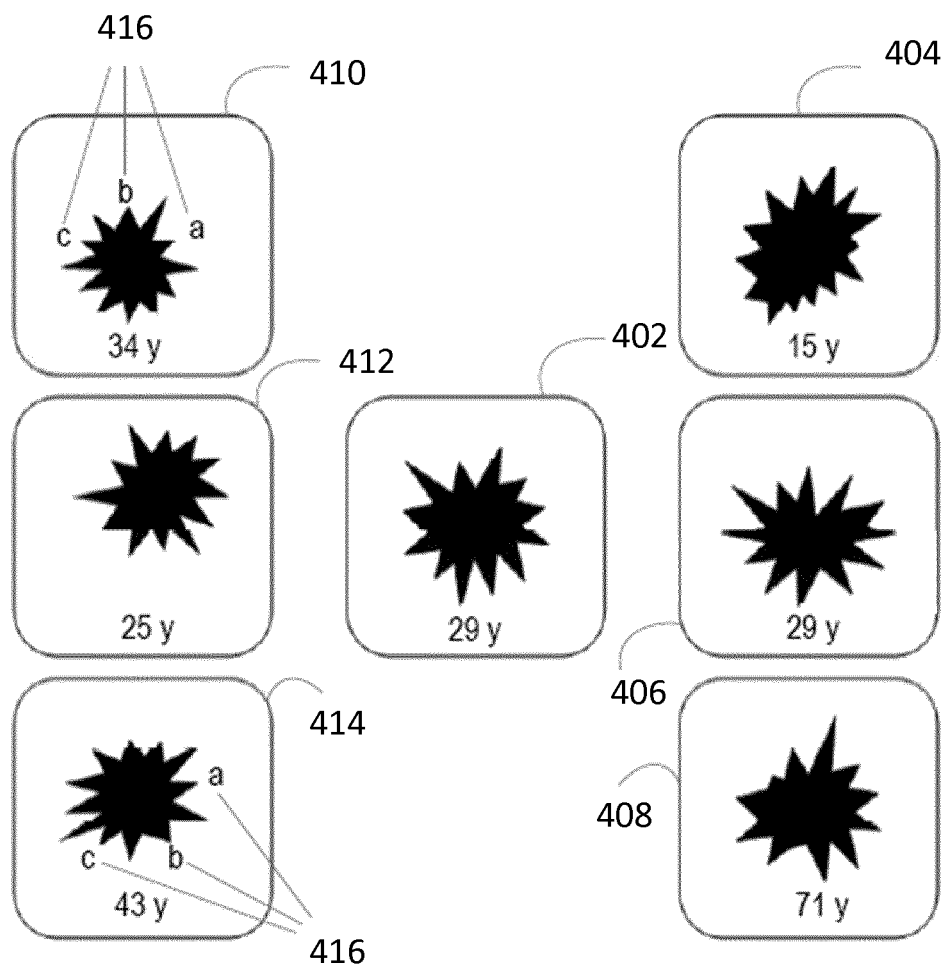
FIG. 4 illustrates an example output of a method according to an embodiment, as displayed to a user.

FIG. 4 illustrates an example output of the method 400 according to an embodiment, where results are displayed to a user. In this embodiment, the first neural network input comprises an image 402 of a spiky shape which may, for example, represent an anatomical object in a medical image. Three second neural network inputs 404, 406, 408 have been identified according to the methods described with respect to FIG. 2 above, where a plurality of second neural network inputs are processed and compared to the first neural network inputs. The second neural network inputs (which meet the requirements set out in step 308) are displayed next to the first neural network input.

In the illustrated embodiment, each identified second neural network input is associated with a dissimilar set of activation values (for an identified subset of neurons of a single layer) to a first set of activation values but a similar second neural network output to the first neural network output. It will be appreciated that, other possible identified second neural network inputs may each be associated with a similar second set of activation values (to the first set of activation values), but a dissimilar second neural network output (to the first neural network output).

Three "similar neural network inputs" are also displayed 410, 412, 414. In the illustrated embodiment, each identified second neural network input is associated with a second set of activation values (for an identified subset of neurons of a single layer) which is similar to a first set of activation values (associated with the first neural network input 402), but a dissimilar second neural network output to the first neural network output of the first neural network input 402.

In this example, annotations 416 of some of features of some of the neural network inputs are also displayed, along with additional context data (e.g. the age of the subject that each neural network input relates to).

Figure 5:
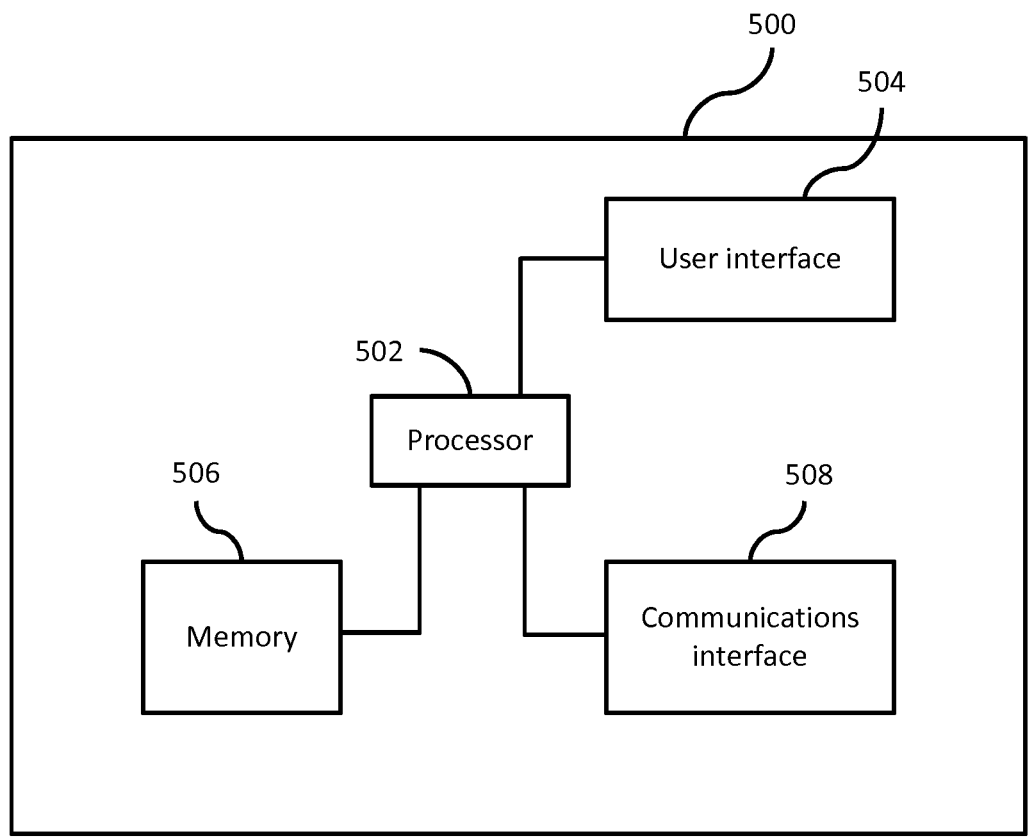
FIG. 5 illustrates a system according to an embodiment.

FIG. 5 shows a block diagram of a system 500 according to an embodiment that can be used for processing input data for a neural network. With reference to FIG. 5, the system 500 comprises a processor 502 that controls the operation of the system 500 and that can implement the method described herein. The system 500 may further comprise a memory 506 comprising instruction data representing a set of instructions. The memory 506 may be configured to store the instruction data in the form of program code that can be executed by the processor 502 to perform the method described herein. In some implementations, the instruction data can comprise a plurality of software and/or hardware modules that are each configured to perform, or are for performing, individual or multiple steps of the method described herein. In some embodiments, the memory 506 may be part of a device that also comprises one or more other components of the system 500 (for example, the processor 502 and/or one or more other components of the system 500). In alternative embodiments, the memory 506 may be part of a separate device to the other components of the system 500.

The processor 502 of the system 500 can be configured to communicate with the memory 506 to execute the set of instructions. The set of instructions, when executed by the processor may cause the processor to perform the method described herein. The processor 502 can comprise one or more processors, processing units, multi-core processors or modules that are configured or programmed to control the system 500 in the manner described herein. In some implementations, for example, the processor 502 may comprise a plurality of processors, processing units, multi-core processors and/or modules configured for distributed processing. It will be appreciated by a person skilled in the art that such processors, processing units, multi-core processors and/or modules may be located in different locations and may each perform different steps and/or different parts of a single step of the method described herein.

Briefly, the set of instructions, when executed by the processor 502 of the system 500 cause the processor 502 to use the neural network to process a first neural network input to produce a first neural network output; use the neural network to process a second neural network input to produce a second neural network output; determine a first similarity indicator, the first similarity indicator indicating a level of similarity between the first neural network output and the second neural network output; select a set of one or more neurons of the neural network, the set of neurons being a subset of the neurons of a single layer of the neural network; determine an activation value of each selected neuron when the neural network is used to process the first neural network input, to thereby produce a first set of activation values; determine an activation value of each selected neuron when the neural network is used to process the second neural network input, to thereby produce a second set of activation values; determine a second similarity indicator indicating a level of similarity between the first set of activation values and a corresponding second set of activation values; and determine whether either: the first similarity indicator indicates a level of similarity above a first predetermined threshold and the second similarity indicator indicates a level of similarity below a second predetermined threshold; or the first similarity indicator indicates a level of similarity below a third predetermined threshold and the second similarity indicator indicates a level of similarity above a fourth predetermined threshold, to thereby predict whether one of the first and second neural network inputs has been inaccurately processed by the neural network.

In some embodiments, the set of instructions, when executed by the processor 502, may also cause the processor 502 to control the memory 506 to store data and information relating to the methods described herein. For example, the memory 506 may be used to store any of the neural network, the first neural network input, the second neural network input(s), the neural network outputs, the identified second neural network inputs, or any other data or information, or any combinations of data and information, which result from the method described herein.

In any of the embodiments described herein, the first and/or second neural network input may comprise any data that can be processed by a neural network to produce a neural network output. For example, the first and/or second neural network input may comprise any one or any combination of: text, image data, sensor data, instrument logs and/or records. In some embodiments, the first and/or second neural network input may comprise medical data such as any one or any combination of medical images (for example, images acquired from a CT scan, X-ray scan, or any other suitable medical imaging method), an output from a medical instrument or sensor (such as a heart rate monitor, blood pressure monitor, or other monitor) or medical records. Thus, a neural network input may comprise any data that can be processed by the neural network (e.g. any combination of images, values and/or alpha-numeric strings, including but not limited to medical images, medical records and/or sensor readings, or any other type of data that can be processed by the neural network). Although examples have been provided of different types of neural network inputs, a person skilled in the art will appreciate that the teachings provided herein may equally be applied to any other type of data that can be processed by a neural network.

In some embodiments, as illustrated in FIG. 5, the system 500 may comprise at least one user interface 504 configured to receive any of the user inputs described herein. The user interface 504 may allow a user of the system 500 to manually enter instructions, data, feedback, or information relating to the method described herein. For example, a user interface 504 may be used by a user to select or indicate a first and/or second neural network input on which to perform the method described herein (e.g. on which to perform the classification process). The user interface 504 may be any type of user interface that enables a user of the system 500 to provide a user input, interact with and/or control the system 500. For example, the user interface 504 may comprise one or more switches, one or more buttons, a keypad, a keyboard, a mouse, a touch screen or an application (for example, on a tablet or smartphone), or any other user interface, or combination of user interfaces that enables the user to select a first neural network input to be classified.

In some embodiments, the user interface 504 (or another user interface of the system 500) may enable rendering (or output or display) of information, data or signals to a user of the system 500. As such, a user interface 504 may be for use in providing a user of the system 500 (for example, a medical professional, a healthcare provider, a healthcare specialist, a care giver, a subject, or any other user) with information relating to or resulting from the method according to embodiments herein. The processor 502 may be configured to control one or more user interfaces 504 to provide information resulting from the method according to embodiments herein. For example, the processor 502 may be configured to control one or more user interfaces 504 to render (or output or display) the first and/or second neural network input or any other information (such as outputs), or any combination information, which results from the method described herein. The user interface 504 may, in some embodiments, comprise a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces for providing information relating to, or resulting from the method, to the user. In some embodiments, the user interface 506 may be part of a device that also comprises one or more other components of the system 500 (for example, the processor 502, the memory 504 and/or one or more other components of the system 500). In alternative embodiments, the user interface 506 may be part of a separate device to the other components of the system 500.

In some embodiments, as illustrated in FIG. 5, the system 500 may also comprise a communications interface (or circuitry) 508 for enabling the system 500 to communicate with any interfaces, memories and devices that are internal or external to the system 500. The communications interface 508 may communicate with any interfaces, memories and devices wirelessly or via a wired connection.

It will be appreciated that FIG. 5 shows the components required to illustrate this aspect of the disclosure and, in a practical implementation, the system 500 may comprise other components in addition to those shown. For example, the system 500 may comprise a battery or other power supply for powering the system 500 or means for connecting the system 500 to a mains power supply.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer implemented method for using a neural network formed of one or more layers of neurons, the method comprising:
    using the neural network to process a first neural network input to produce a first neural network output;
    using the neural network to process a second neural network input to produce a second neural network output;
    determining a first similarity indicator, the first similarity indicator indicating a level of similarity between the first neural network output and the second neural network output;
    selecting a set of one or more neurons of the neural network, the set of neurons being a subset of the neurons of a single layer of the neural network;
    determining an activation value of each selected neuron when the neural network is used to process the first neural network input, to thereby produce a first set of activation values;
    determining an activation value of each selected neuron when the neural network is used to process the second neural network input, to thereby produce a second set of activation values;
    determining a second similarity indicator indicating a level of similarity between the first set of activation values and a corresponding second set of activation values;
    determining a potential inaccurate processing by the neural network of one of the first and second neural network inputs, the potential inaccurate processing comprising either:
        the first similarity indicator indicating a level of similarity above a first predetermined threshold and the second similarity indicator indicating a level of similarity below a second predetermined threshold; or
        the first similarity indicator indicating a level of similarity below a third predetermined threshold and the second similarity indicator indicating a level of similarity above a fourth predetermined threshold, and
    flagging the potential inaccurate processing to a user.

2. The computer-implemented method of claim 1, wherein:
    the step of using the neural network to process a first neural network input comprises classifying the first neural network input into a classification, the classification being the first neural network output;
    the step of using the neural network to process a second neural network input comprises classifying the second neural network input into a classification, the classification being the second neural network output;
    the step of determining a first similarity indicator comprises generating a first similarity indicator identifying whether the classifications of the first and second neural network inputs are the same; and
    the step of determining a potential inaccurate processing by the neural network of whether one of the first and second neural network inputs comprises determining whether either:
        the first similarity indicator indicates that the classifications of the first and second neural network inputs are the same and the second similarity indicator indicates a level of similarity below a second predetermined threshold; or
        the first similarity indicator indicates that the classifications of the first and second neural network inputs are different and the second similarity indicator indicates a level of similarity above a fourth predetermined threshold.

3. The computer-implemented method of claim 1, wherein the set of neurons comprises at least two neurons of the same layer.

4. The computer-implemented method of claim 3, wherein the step of determining a second similarity indicator comprises calculating a multidimensional distance between the first set of values and the second set of values.

5. The computer-implemented method of claim 1, wherein the second and fourth predetermined thresholds are predetermined threshold distances.

6. The computer-implemented method of claim 1, wherein the step of selecting a set of one or more neurons comprises selecting one or more neurons in a same layer having activation values lying outside a predetermined range of activation values when the neural network is used to process the first neural network input.

7. The computer-implemented method of claim 1, wherein the step of selecting a set of one or more neurons comprises selecting one or more neurons in a same layer having activation values lying outside a predetermined range of activation values when the neural network is used to process the second neural network input.

8. The computer-implemented method of claim 1, wherein:
    the step of using the neural network to process a second neural network input comprises using the neural network to process a plurality of second neural network inputs to thereby generate a plurality of second neural network outputs;
    the step of determining a first similarity indicator comprises determining, for each of the plurality of second neural network inputs, a first similarity indicator indicating a level of similarity between the first neural network output and the second neural network output to thereby produce a plurality of first similarity indicators;

the step of producing a second set of activation values comprises determining, for each of the plurality of second neural network inputs, an activation value of each selected neuron when the neural network is used to process the second neural network input, to thereby produce a second set of activation values for each second neural network input and thereby a plurality of second sets of activation values;

the step of determining a second similarity indicator comprises determining, for each of the plurality of second neural network inputs, a second similarity indicator indicating a level of similarity between the first set of activation values and a corresponding second set of activation values to thereby produce a plurality of second similarity indicators; and the step of determining a potential inaccurate processing by the neural network of one of the first and second neural network inputs comprises:

determining, for each second neural network input, whether either the first similarity indicator indicates a level of similarity above a first predetermined threshold and the second similarity indicator indicates a level of similarity below a second predetermined threshold; or the first similarity indicator indicates a level of similarity below a third predetermined threshold and the second similarity indicator indicates a level of similarity above a fourth predetermined threshold, to thereby determine, for each second neural network input, whether one of the first and second neural network inputs has been potentially inaccurately processed by the neural network; and identifying all second neural network inputs for which it is determined that one of the first and second neural network inputs has been potentially inaccurately processed by the neural network.

9. The method of claim 8, wherein the step of determining a second similarity indicator for each second neural network input comprises:

performing multidimensional clustering on the first set of activation values and each of the plurality of second set of activation values; and generating, for each second neural network input, a second similarity indicator indicating whether the first neural network input and the second neural network inputs are associated with sets of activation values in a same cluster.

10. A computer implemented method as in a claim 1, further comprising obtaining a user input indicating a correct neural network output for one or more the first and second neural network input, and re-training the neural network based on the correct neural network output.

11. A computer program product comprising a non-transitory computer readable medium, the computer readable medium having computer readable code embodied therein, the computer readable code being configured such that, on execution by a suitable computer or processor, the computer or processor is caused to perform the method of claim 1.

12. A computer implemented method as in claim 1, wherein the first and/or second neural network input comprises any one or any combination of medical images, an output from a medical instrument or sensor, or medical records.

13. A system for using a neural network formed of one or more layers of neurons comprising:

a memory comprising instruction data representing a set of instructions;

a processor configured to communicate with the memory and to execute the set of instructions, wherein the set of instructions, when executed by the processor, cause the processor to:

use the neural network to process a first neural network input to produce a first neural network output;

use the neural network to process a second neural network input to produce a second neural network output;

determine a first similarity indicator, the first similarity indicator indicating a level of similarity between the first neural network output and the second neural network output;

select a set of one or more neurons of the neural network, the set of neurons being a subset of the neurons of a single layer of the neural network;

determine an activation value of each selected neuron when the neural network is used to process the first neural network input, to thereby produce a first set of activation values;

determine an activation value of each selected neuron when the neural network is used to process the second neural network input, to thereby produce a second set of activation values;

determine a second similarity indicator indicating a level of similarity between the first set of activation values and a corresponding second set of activation values; and determine a potential inaccurate processing by the neural network of one of the first and second neural network inputs, the potential inaccurate processing comprising either:

the first similarity indicator indicates a level of similarity above a first predetermined threshold and the second similarity indicator indicates a level of similarity below a second predetermined threshold; or the first similarity indicator indicates a level of similarity below a third predetermined threshold and the second similarity indicator indicates a level of similarity above a fourth predetermined threshold, and flag the potential inaccurate processing to a user.

* * * * *